United States Patent [19]
Tomita et al.

[11] Patent Number: 5,202,928
[45] Date of Patent: Apr. 13, 1993

[54] SURFACE GENERATION METHOD FROM BOUNDARIES OF STEREO IMAGES

[75] Inventors: Fumiaki Tomita; Kazuhide Sugimoto; Hironobu Takahashi, all of Tsukuba, Japan

[73] Assignees: Agency of Industrial Science and Technology, Tokyo; Sanyo Electric Co., Osaka, both of Japan

[21] Appl. No.: 601,657

[22] Filed: Jul. 21, 1989

[30] Foreign Application Priority Data

Sep. 9, 1988 [JP] Japan ................... 63-226761

[51] Int. Cl.⁵ .................. G06K 9/48; G01C 3/14; H04N 13/00
[52] U.S. Cl. ...................... 382/1; 382/22; 382/9; 395/121
[58] Field of Search ............. 356/12; 358/3; 364/522; 382/21, 22, 9; 395/121

[56] References Cited
U.S. PATENT DOCUMENTS 4,594,673  6/1986  Holly .................................. 364/522
4,791,482 12/1988  Barry et al. ........................ 382/21
4,845,651  7/1989  Aizawa et al. ..................... 364/522
4,858,150  8/1989  Aizawa et al. ..................... 364/522
4,870,600  9/1989  Hiraoka ............................. 364/522
4,901,252  2/1990  Fitzgerald et al. ................. 364/522

Primary Examiner—David K. Moore
Assistant Examiner—Barry Stellrecht
Attorney, Agent, or Firm—Darby & Darby

[57] ABSTRACT

An image processing method for matching edges detected in images of the same objects in a three-dimensional scene which are taken simultaneously by two or more image pick-up devices at different positions, in which the boundary segments on the edges are classified into apparently real segments, apparently imaginary segments or undefined segments, a planar surface is found for each boundary which has all apparently real segments and no apparently imaginary segment on it by using the information of the points of occlusion, the surface is regarded as the real surface in the case where there is only one surface which has no segment under it, so that surface information and the distance information at arbitrary points on the real surface are obtained.

2 Claims, 21 Drawing Sheets

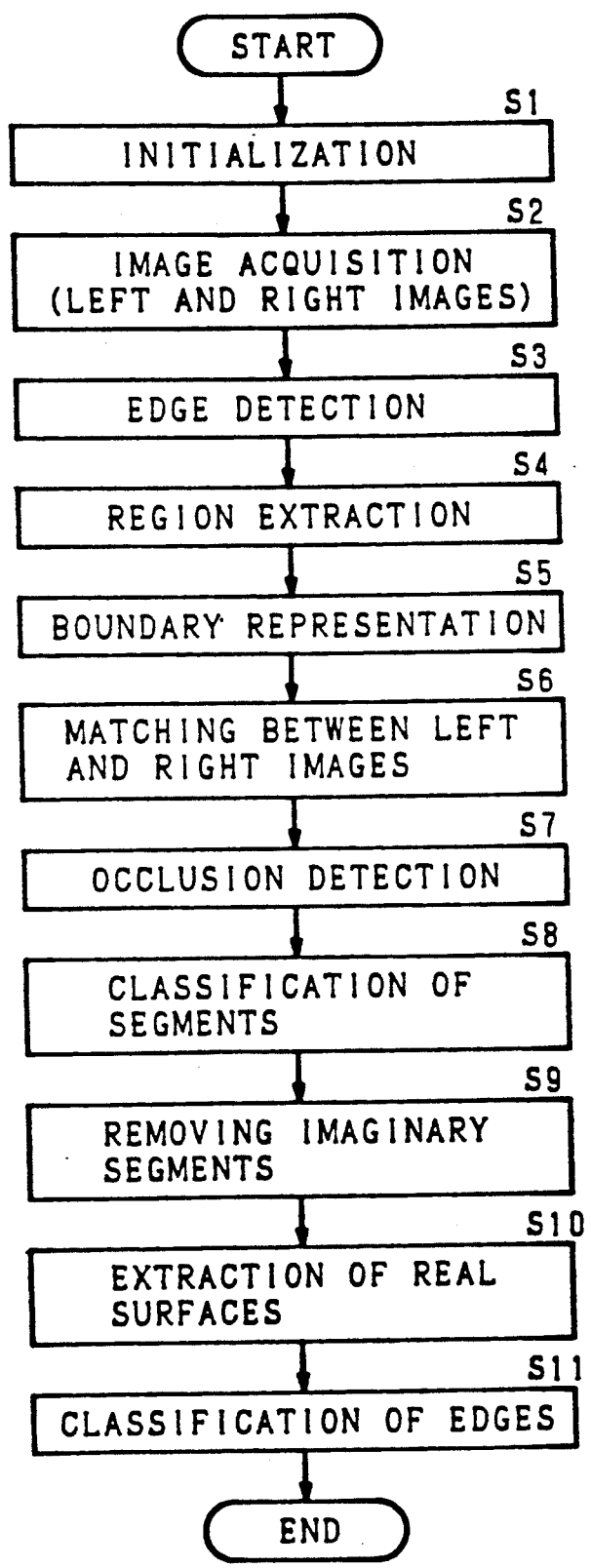

○ : POINT OF OCCLUSION

━━ : REAL SEGMENT

----- : IMAGINARY SEGMENT

——— : UNDEFINED SEGMENT

━━ : EDGE

FIG. 8b

| | INCLUDING ONLY UNDEFINED SEGMENT | INCLUDING APPARENTLY REAL SEGMENT AND UNDEFINED SEGMENT | INCLUDING ONLY APPARENTLY IMAGINARY SEGMENT AND UNDEFINED SEGMENT | INCLUDING BOTH OF APPARENTLY REAL SEGMENT AND APPARENTLY IMAGINARY SEGMENT |
|---|---|---|---|---|
| CLOCKWISE | ① | ② | ③ | ④ |
| COUNTER-CLOCKWISE | ⑤ | ⑥ | ⑦ | ⑧ |

⎯⎯← : REAL SEGMENT

--◄-- : IMAGINARY SEGMENT

⟵ : REAL SEGMENT

--◂-- : IMAGINARY SEGMENT

SURFACE GENERATION METHOD FROM BOUNDARIES OF STEREO IMAGES

BACKGROUND OF THE INVENTION

1. Field of the Invention

The present invention relates to an image processing method which analyzes images of the same objects in a scene taken simultaneously from different viewpoints by two or more image pick-up devices, and thereby estimates the real surface of the objects in three-dimensional space, and obtains information thereon.

2. Description of Related Art

Stereoscopy is known as a method for obtaining three-dimensional (or distance) information of a scene using the images taken by two or more image pick-up devices. The distances are computed according to the principle of triangulation using the corresponding points between the images. There are two common approaches for finding corresponding points between the images: the area-based stereo and the edge-based stereo.

The area-based stereo binds the corresponding points between the images by computing local correlations between the images and can give the dense distance map of the scene in the case where the surface are covered with textures. However, it cannot be applicable in the case where the surfaces are uniform, that is, there is no texture on the surfaces.

The edge-based stereo first detects edges in each image by computing intensity gradient at each point in the image, and then find the corresponding edges between the images.

This approach, however, computes the distances only of the edges but gives no distance information of the inner points on the surfaces of the objects in the scene. Usually, a surface interpolation technique is used to fit a smooth surface bounded by the edges. However, it is not applicable when it is not known in advance which side of the edge is the actually existing surface or if both sides are the actually existing surfaces. Otherwise false surfaces are created by the interpolation.

SUMMARY OF THE INVENTION

The present invention has been achieved in the light of such circumferences, and whose purpose is to provide an image processing method for estimating actually existing surfaces using the edges detected in the stereo images. Also, the purpose of the invention is to provide an image processing method which classifies edges into either occluding, convex, concave or flat edges according to the relations between estimated surfaces.

An image processing method is disclosed for matching edges detected in images of the same objects in a three-dimensional scene which are taken simultaneously by two or more image pick-up devices at different positions, in which the boundary segments on the edges are classified into apparently real segments, apparently imaginary segments or undefined segments. In accordance with the invention, a planar surface is found for each boundary which as all apparently real segments an non apparently imaginary segment on it by using the information of the points of occlusion. The surface is regarded as the real surface in the case where there is only one surface which has not segment under it, so that surface information and the distance information at arbitrary points on the real surface are obtained.

The above and further objects and features of the invention will more fully be apparent from the following detailed description with accompanying drawings.

BRIEF DESCRIPTION OF THE DRAWINGS

FIG. 3 is a flowchart showing procedures of the image processing method of the present invention, FIG. 8(b) is table of classification of eight types of boundaries.

DESCRIPTION OF THE PREFERRED EMBODIMENT

Figure 1:
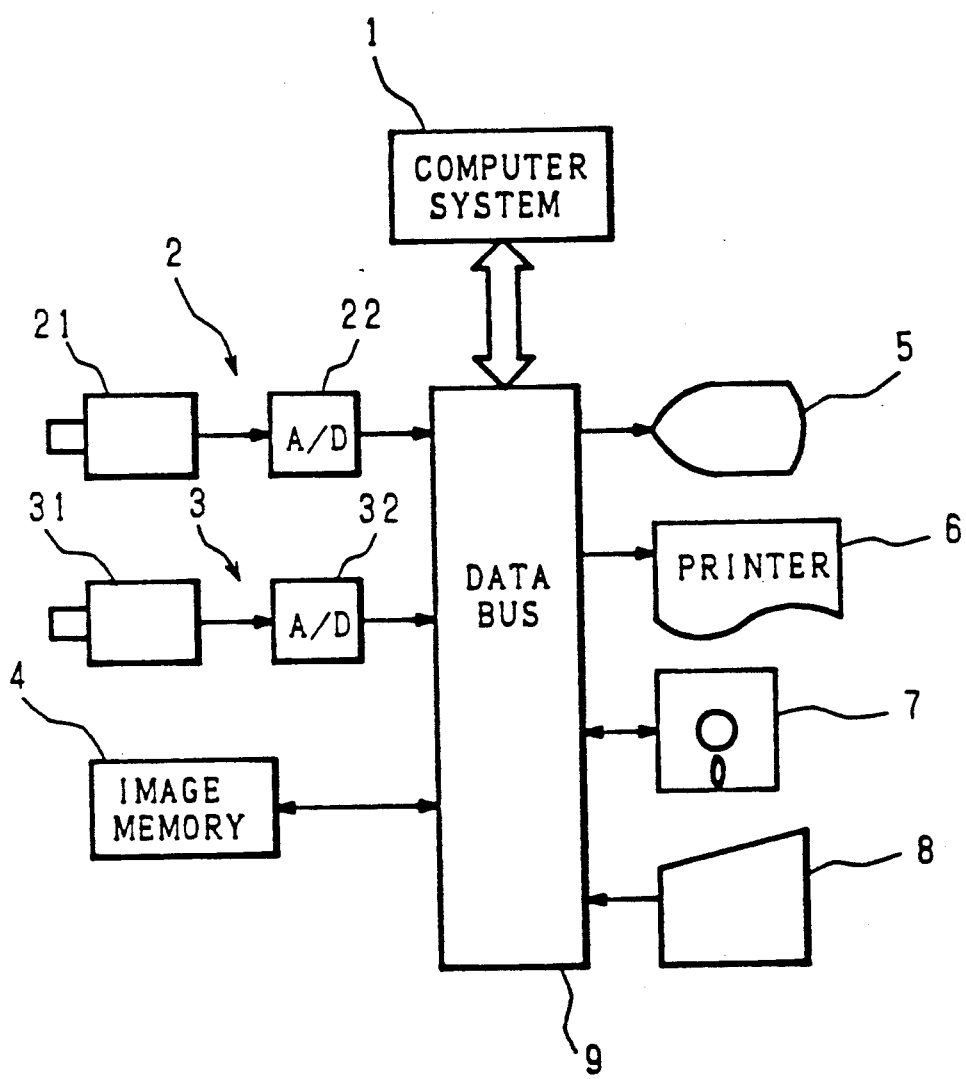
FIG. 1 is a block diagram showing a configuration of an image processing apparatus for carrying out the image processing method in accordance with the present invention.

FIG. 1 is a block diagram showing a configuration of an image processing apparatus used for carrying out the method in accordance with the present invention.

This apparatus is constituted with a computer system 1 as a CPU, television camera units 2 and 3 as two image pickup devices, an image memory 4, a CRT display 5, a printer 6, a floppy disc system 7, a keyboard terminal 8, a data bus 9 connecting the above components, and the like.

The television camera units 2 and 3 are constituted respectively with ITV cameras 21 and 31 of the same specifications which input front scene and output an analog image data, and A/D converters 22 and 32 which convert the outputted analog data into digital image data of, for example, 512×512 pixels and 256 levels of intensity.

Figure 2:
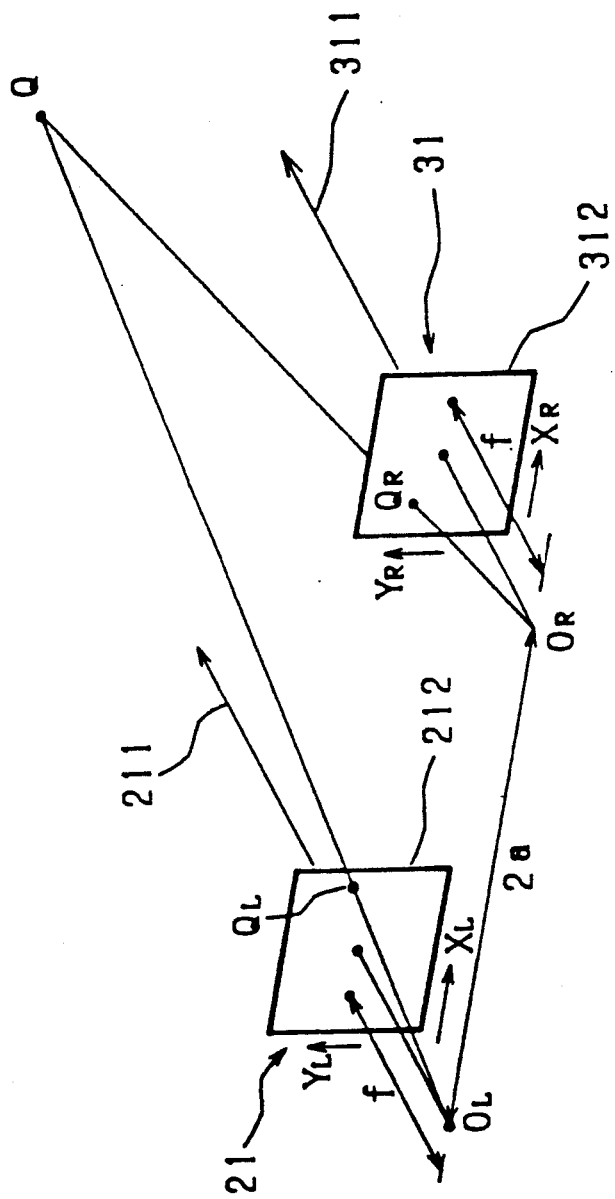
FIG. 2 is a schematic diagram showing the model of image projection by the image pick-up devices thereof.

As shown in FIG. 2, the left ITV camera 21 and the right ITV camera 31 are set so that the respective optical axes thereof 211 and 311 are parallel and the respective image planes thereof 212 and 213 are positioned on the same plane. Accordingly, let the bottom sides of the both image planes 212 and 213 be on $X_L$-axis and an $X_R$-axis, respectively, and the left sides thereof be a $Y_L$-axis and a $Y_R$-axis, respectively. Then, the $X_L$-axis and the $X_R$-axis are positioned on the same straight line, and the $Y_L$-axis and the $Y_R$-axis are parallel to each other.

The image memory 4 is a RAM capable of writing and reading, and is used for storing not only digital image data from the left ITV camera 21 and the right ITV camera 31 but also various other data.

The CRT display 5 and the printer 6 are used mainly for outputting the processing result of the computer system 1 and the like, and the floppy disc system 7 is used for registering the output of the processing result of the computer system 1. The keyboard terminal 8 is used for inputting various commands by the operator.

FIG. 3 is a flowchart showing procedures of the image processing method of the present invention carried out by the image processing apparatus as described above.

First, the image processing apparatus as shown in FIG. 1 is initialized (Step S1), and thereafter the left and right images are taken and inputted by the ITV cameras 21 and 31 (Step S2).

Next, the strength and direction of the edge is computed at each point in the image by a gradient operator (Step S3). The strong edges of one pixel wide is extracted by the weak edge suppression and the non-maximal edge suppression, so that the strong edges are extended to close regions.

After labeling regions (Step S4), the edge around each region is traced in a clockwise direction to extract the boundary of the region. The boundary is segmented at branching points and/or the bending points, and the resulting segments are fitted to a line or a quadratic curve (Step S5).

Figure 4A:
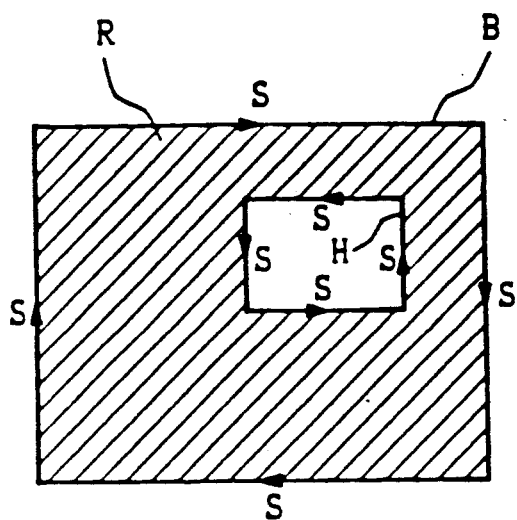
FIGS. 4(a) and 4(b) are a schematic diagram showing an example of boundary representation of a region as a result of image processing.
Figure 4B:
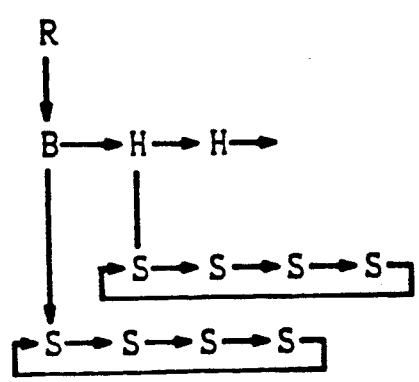

FIG. 4 is a schematic diagram showing an example of boundary representations of a region as a result of image processing of the present invention. A hatched region R has a peripheral boundary B and an inner (a hole) boundary H, and each boundary is represented by a list of ordered segments. A pair of stereo images are matched on this data structure and the segments are used as the units for correspondence (Step S6).

Figure 5:
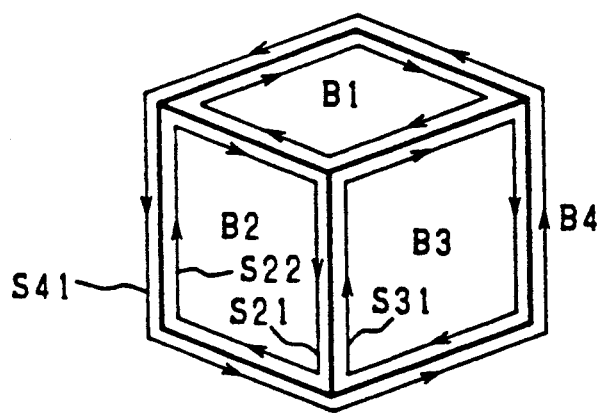
FIG. 5 is a schematic diagram showing a cube and the associated boundary segments on the edges.

For example, consider a three-dimensional block as shown in FIG. 5. The output of the stereo represents the edges of the block by four directed boundaries B1 to B4. Though the boundary segments are exactly positioned on the edges, they are separate from the edge only to show the existence of two segments of opposite direction on each edge.

Each boundary segment signifies existence of a surface on the right thereof.

However, for example, segments on the boundary B4 are imaginary segments which represent no existing surface. Each occluding edge is held in common by pair of segments consisting of a real segment and an imaginary segment. Imaginary segments cause creation of false surfaces by simple surface interpolation. It is necessary to remove imagery segments out of the occluding edges. This method is described later.

Next, points of occlusion, at which distance abruptly

The explanation of detection of occlusion is as follows. Stereoscopy computes distances at portions of objects which are visible in both images viewed by two or more image pickup devices located at different positions. However, in certain three-dimensional scenes, it is possible that there are portions which are visible in one image at one image pickup device but are invisible in the other image for example, when front objects occlude rear objects. This phenomenon is called occlusion.

Figure 19:
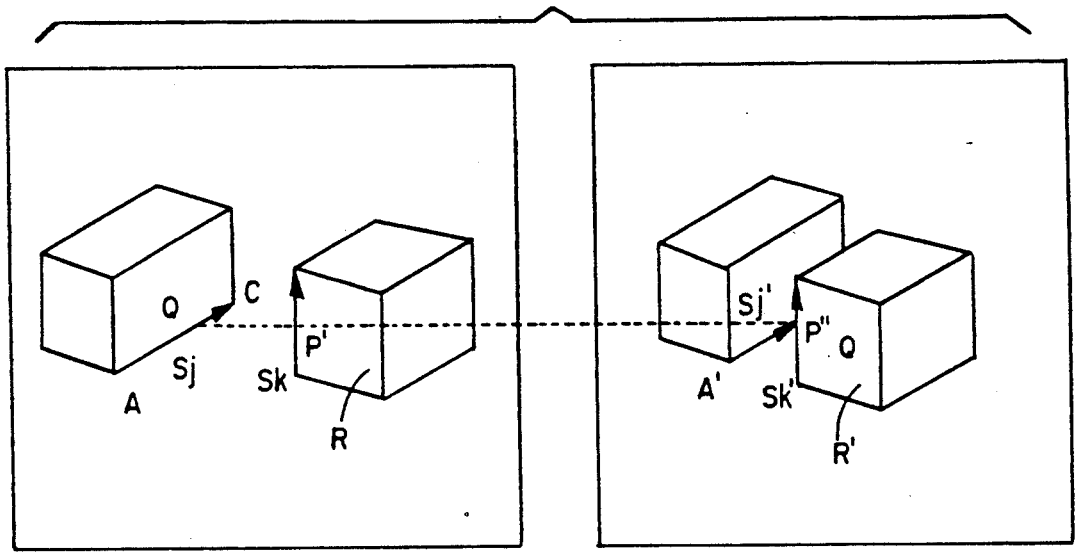
FIG. 19 is a schematic diagram showing occlusion effect in a two block scene.

This is explained by referring to FIG. 19. Here there is a pair of incompletely matching segments (Sj, SJ') at a point of occlusion P' (Right Image). The portion AQ of segment Sj corresponds to the portion A'Q' of segment Sj', whereas the portion of QC of the left image of Sj has no correspondence in the Right Image.

The process to detect such an occlusion is as follows:

1) Find a segment Sj which partly corresponds to segment Sj' but has no more corresponding segment from the middle point Q (Left Image).

2) Search for another segment Sk'. Then, the point Q' (also P' of Right Image) correspond to the two points, Q' on segment Sj and p on segment Sk (Left Image).

3) Let dj be the disparity between Q and Q', and dk be the disparity between P and P' (Q'). If dk>dj, then the portion QC of segment Sj is occluded by segment Sk' (or region R') in the Right Image from the point of occlusion Q'.

Figure 6A:
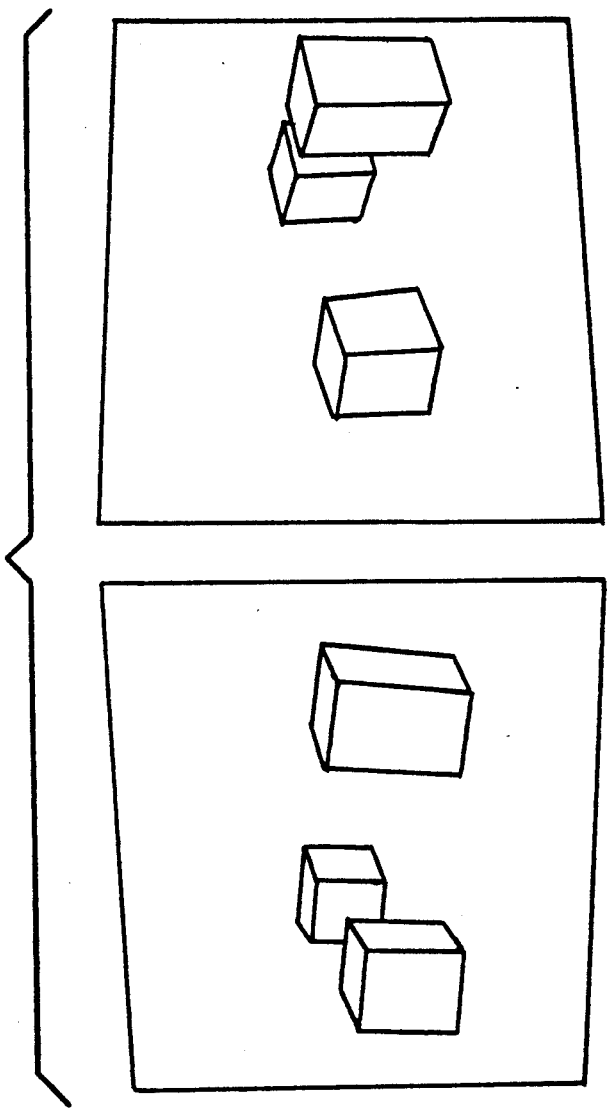
FIG. 6(a) is a schematic diagram of a pair of stereo images obtained by the image pick-up devices.
Figure 6B:
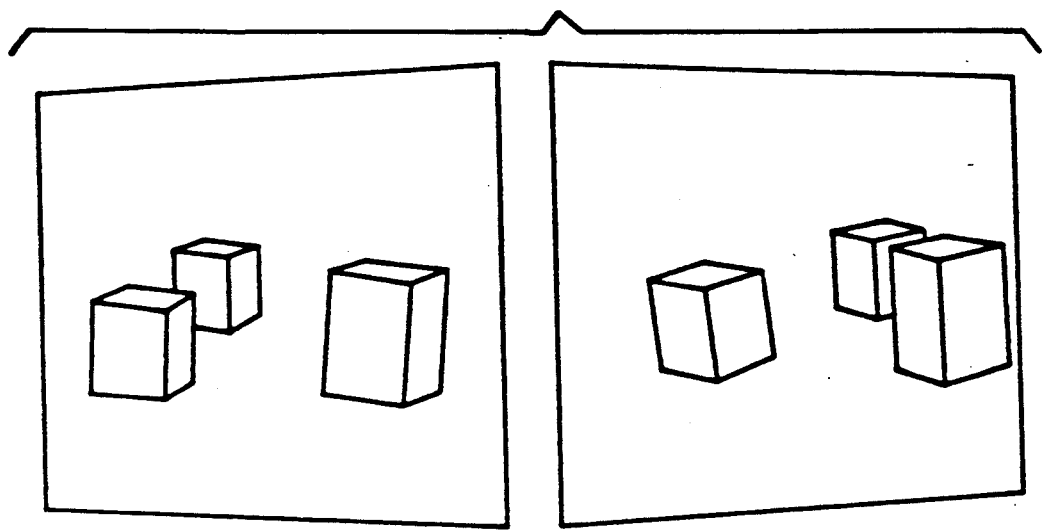
FIG. 6(b) is a schematic diagram showing segments detected in the images in FIG. 6(a)
Figure 6C:
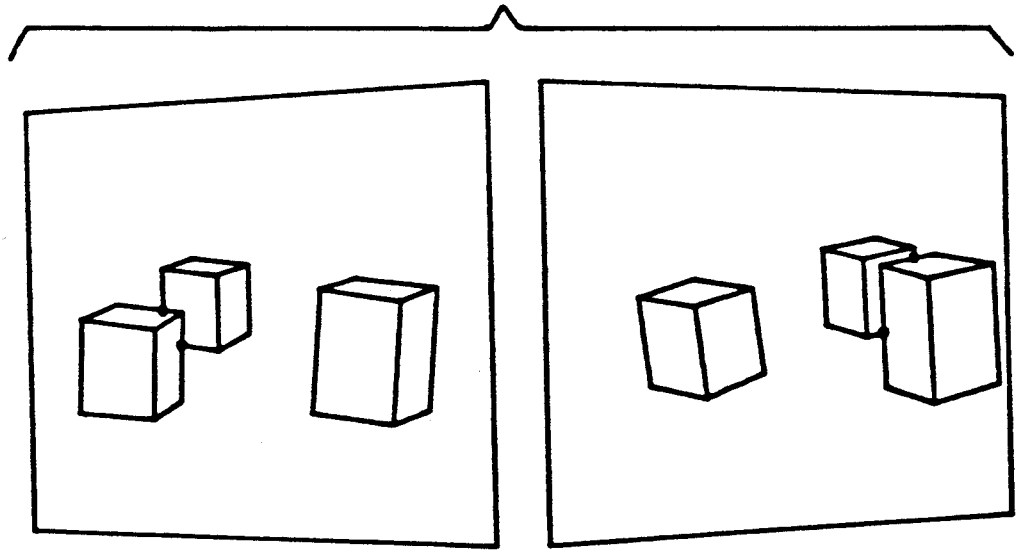
FIG. 6(c) is a schematic diagram showing occlusions detected in images in FIG. 6(a)

FIG. 6(c) shows the points of occlusion detected in the scene in FIG. 6(b).

Next, the segments of each boundary are classified based on the direction of the boundary and the points of occlusion detected on the boundary (Step S8).

Figure 7:
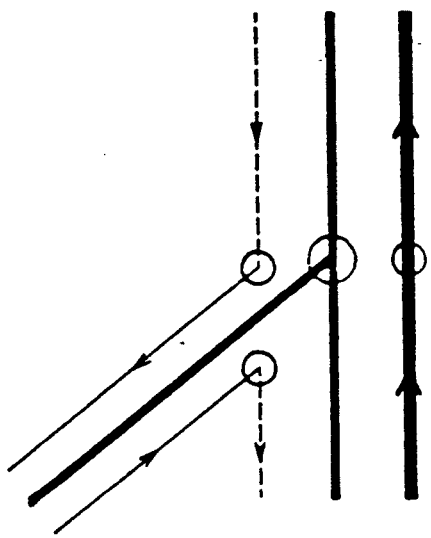
FIG. 7 is a schematic diagram showing apparently real segments and apparently imaginary segments at a point of occlusion.

At a point of occlusion in FIG. 7, two apparently real segments (solid thick line) and two apparently imaginary segments (broken line) are identified. Here, the "apparently real segment" is a segment on the boundary of an actually existing surface which occludes object behind it or the background in the image, and the "apparently imaginary segment" is a segment on the opposite side of the apparently real segment. The other segments are referred to as the "undefined segment" (solid thin line). Procedure of judging whether each undefined segment is the real segment or the imaginary segment is as follows.

Figure 8A:
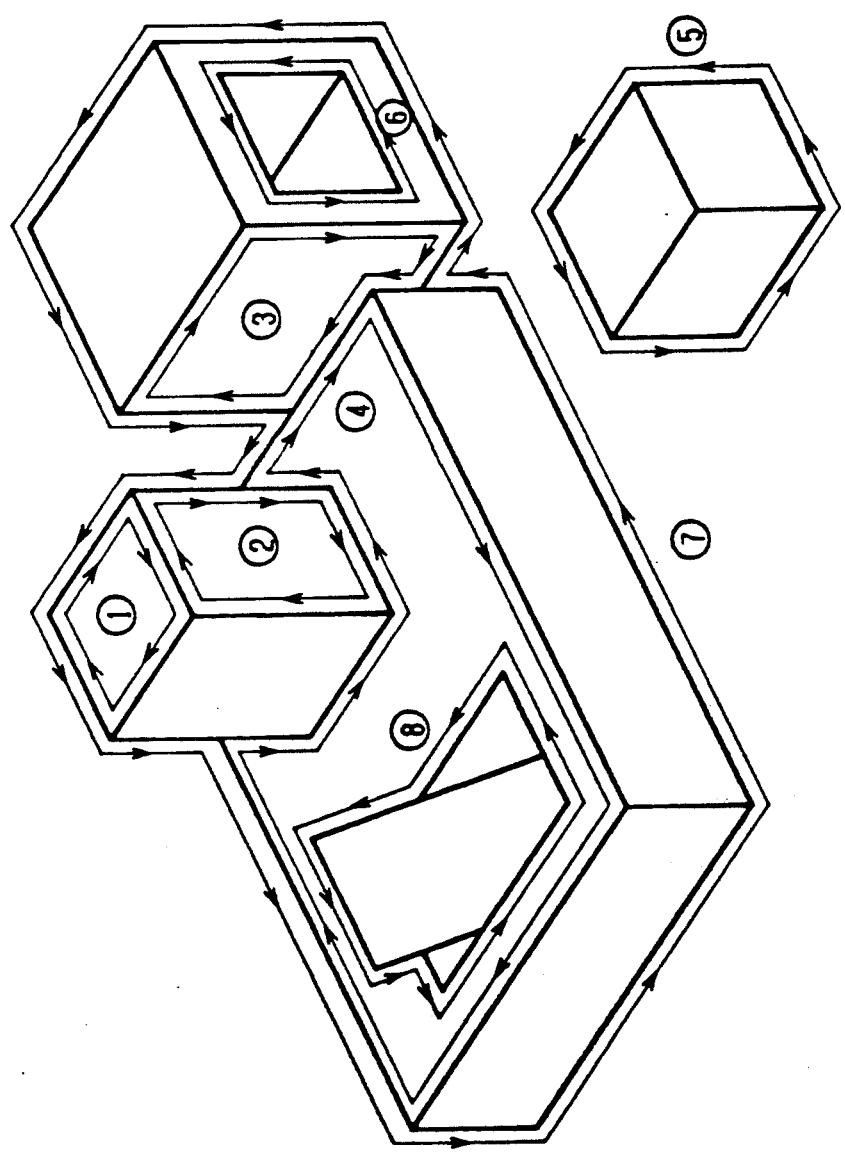
FIG. 8(a) is a schematic diagram showing a scene of several objects and the associated boundary segments on edges of the objects.

There are eight types of boundaries, as shown in a schematic diagram of FIG. 8(a) and a table of FIG. 8(b); four types are classified by a combination of the apparently real segment and the apparently imaginary segment on the boundary and two types are classified by the direction (clockwise or counterclockwise) of the boundary. The boundary of types ① and ⑤ has only undefined segments and no apparently real nor apparently imaginary segment on it, the boundary of type ② and ⑥ has apparently real segments but no apparently imaginary segment on it, the boundary of types ③ and ⑦ has apparently imaginary segments but no apparently real segment on it, and the boundary of types ④ and ⑧ has both apparently real and apparently imaginary segments on it.

Figure 20:
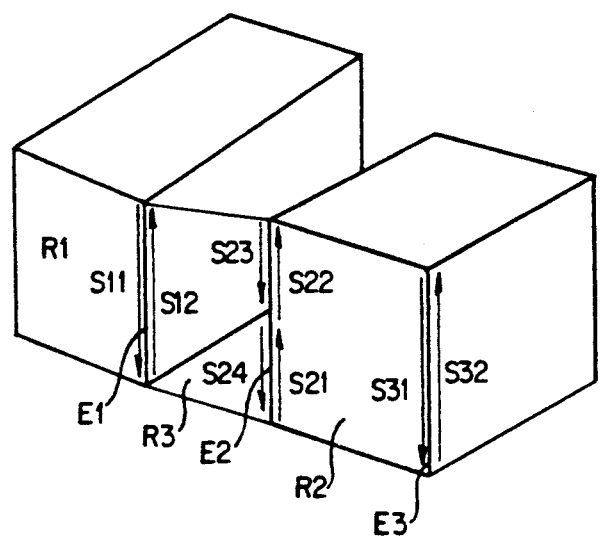
FIG. 20 is a schematic diagram showing creation of a false surface by simple surface interpolations.

To interpolate the surface to each region, it is necessary to obtain 3D loops of 3D line segments which surround related regions. The arrow of each segment on the loop signifies existence of a surface on the right as shown in FIG. 20. Only the segments which are just on the lop can contribute to interpolate the surface of the loop. In other words, all of the other segments which are not on the loop are of no significance.

There are two types of edges, one is a ridge edge which is the intersection of two surfaces and the other is an occluding edge which is generated at the depth gap between the front object and background. All the segments which are just on the ridge edges (just on the visible surface) are the real segments. But there are two types of segments on the occluding edges. And they should be classified into either the real segment which is on the visible surface or the imaginary segment which is on the invisible surface from the current view point.

Imaginary segments are the causes that create false surfaces. Simple interpolation creates false surfaces. As shown in FIG. 30, edge E1 and E3 are the ridge edges. Segment S11 and S12 are just on the edge E1, segment S31 and S32 are just on the edge E3 respectively. On the other hand, edge E2 is the occluding edge on which there exists segments S21, S22, S23, S24. In the case that segment S21, S22 and S31 are used, surface R2 is interpolated. But in the case that segment S11, S23 and S24 are used, surface R3 which is non-existing false surface is interpolated. It is very important point not to use the imaginary segments to interpolate surfaces.

First, as procedure (1), look for candidates for a real planar surface for each boundary which include all the apparently real segments and no apparently imaginary segments on them, using the information at the points of occlusion if it exits. These candidates are composed by random pairs of segments which are coplanar.

Next, as procedure (2), selects only one candidate from a result of procedure (1) if there are some candidates. In the case where there is only one planar surface on which or above which and never under which any other segments exist ("above" means the side of the view point of the space divided by the plane and "under" means the opposite side), the planar surface is determined to be an actually existing surface and referred to as a real surface.

In interpolating the surface to each region, it is important to pay attention only to the 3D loop of 3D line segments which surrounds the related region. In case of FIG. 9 where the boundary B4 is interpolated, only eight segments of S41-S48 need be considered and it is not necessary at all to consider the segments on the other boundary, for example B5, B6.

As a result of the above procedures, the segments on the real surface are determined to be the real segments and the segments above the real surface to be the imaginary segments, and therefore the imaginary segments are removed (Step S9). Then, the real surfaces are generated using the real segments (Step S10). Some examples are as follows.

Hereinafter, description is made on a concrete example.

Figure 9:
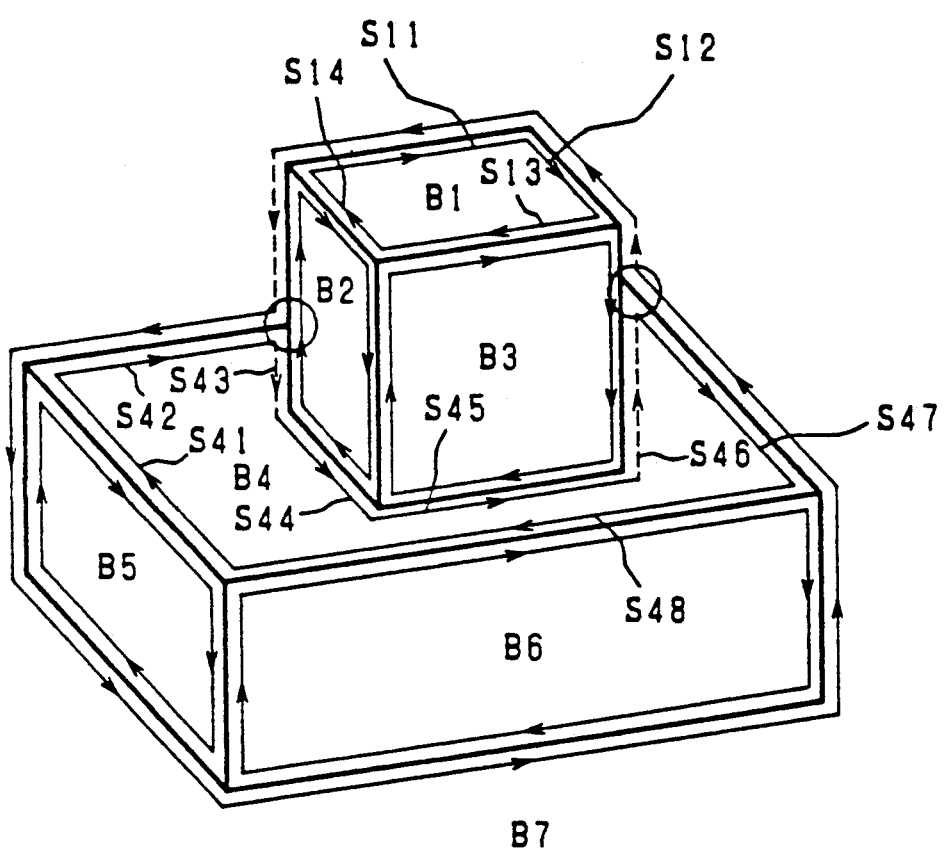
FIG. 9 is a schematic diagram showing boundaries of a scene where one block exists on another block.

As shown in FIG. 9, the first example is a scene where one block is placed on another block. There are seven boundaries B1 to B7 and two points of occlusions. Consider boundaries B1, B2, B3, B5 and B6, each of which has no apparently imaginary segment on it.

First, the procedure (1) is executed for the boundary B1 constituted with segments S11 to S14. One planar surface is found by using all the segments S11, S12, S13 and S14. Executing the procedure (2), all the segments are determined to be the real segments because all segments are on this planar surface. The similar results are obtained with respect to other boundaries B2, B3, B5 and B6.

Next, consideration is made on the clockwise boundary B4 constituted with segments S41 to S48, among which the segments S43 and S46 are the apparently imaginary segments. In the procedure (1), a planar surface must be found that does not include the segments S43 and S46. Here, consideration is made on two cases.

Figure 10A:
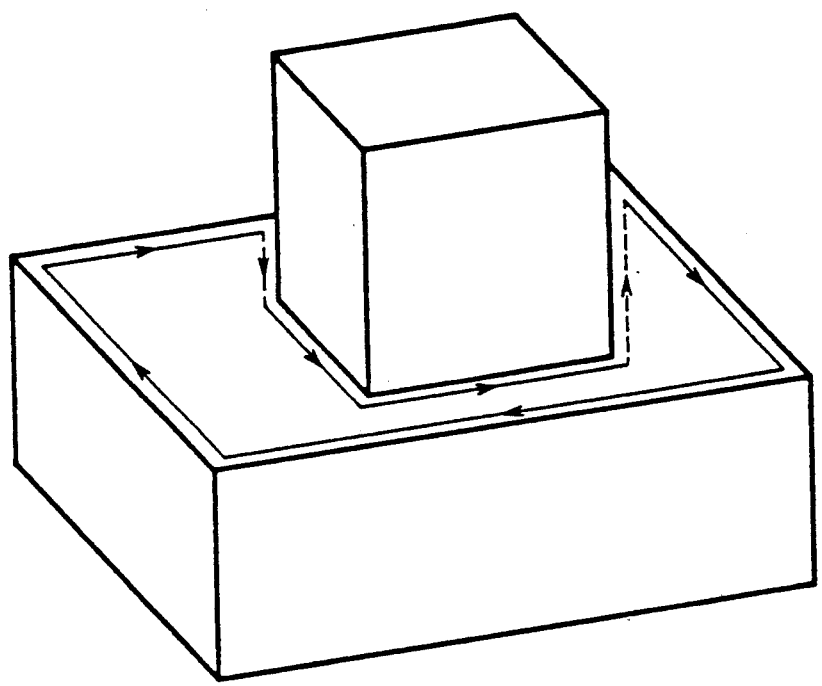
FIG. 10(a) is a schematic diagram showing real segments and imaginary segments where two blocks are in contact with each other.

The first case is that an upper block is in contact with a lower block. The segments S41, S42, S44, S45, S47 and S48 form a planar surface by the procedure (1). Then, all the segments except for the segments S43 and S46 are determined to be the real segments (solid line) by the procedure (2) because they are on the surface, as shown in FIG. 10(a).

The second case is that the upper block is separate from the lower block. Some planar surfaces are found by the combination of segments by the procedure (1). For example, the segments S44 and S45 can form a planar surface. However, the surface is not regarded as the real surface by the procedure (2) because the segment S41, for example, becomes under the surface.

Figure 10B:
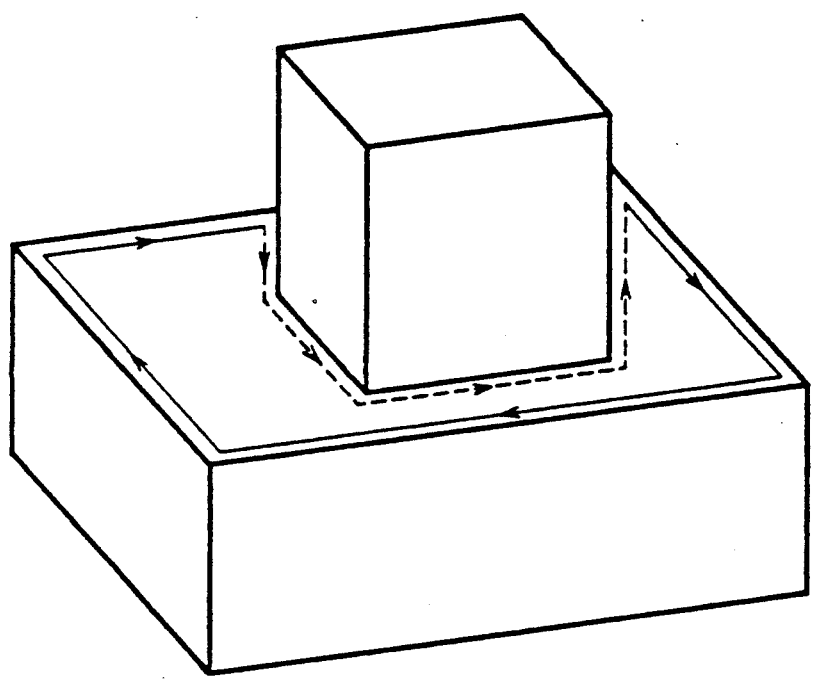
FIG. 10(b) is a schematic diagram showing real segments and imaginary segments where two blocks are not in contact with each other.

The segments S45 and S47 cannot form a planar surface because they are positioned in a mutually twisted relation. The segments S45 and S48 can form a planar surface. However, the surface is not regarded as the real surface by the procedure (2) because the segment S41, for example, becomes under the surface. The segments S41 and S42 can form a planar surface. This surface is regarded as the real surface by the procedure (2) because the segments S47 and S48 are on the surface and the other segments S41, S42, S47 and S48 are determined to be the real segments and the other segments to be the imaginary segments, as shown in FIG. 10(b).

Figure 11A:
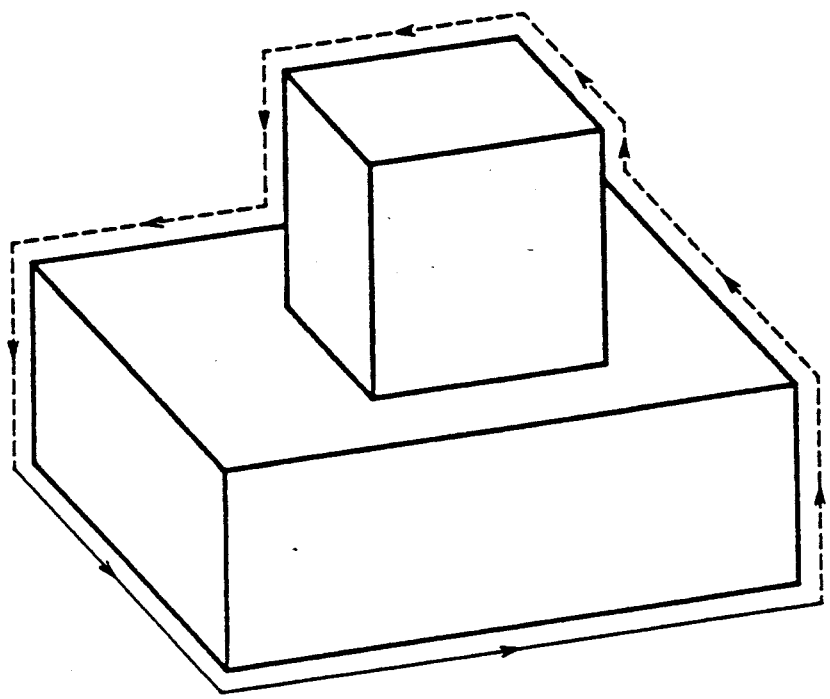
FIG. 11(a) is a schematic diagram showing a result of classification of segments where a block exists on a base surface.

Subsequently, consideration is made on the counterclockwise boundary B7 whereupon on apparently real segment exits. Where the surrounding surface on the right side of the arrow is already defined as a real surface like a floor or a road, and the block positioned lower side is on it, the two segments at a bottom of the lower block are regarded as the real segments, as shown in FIG. 11(a).

Figure 11B:
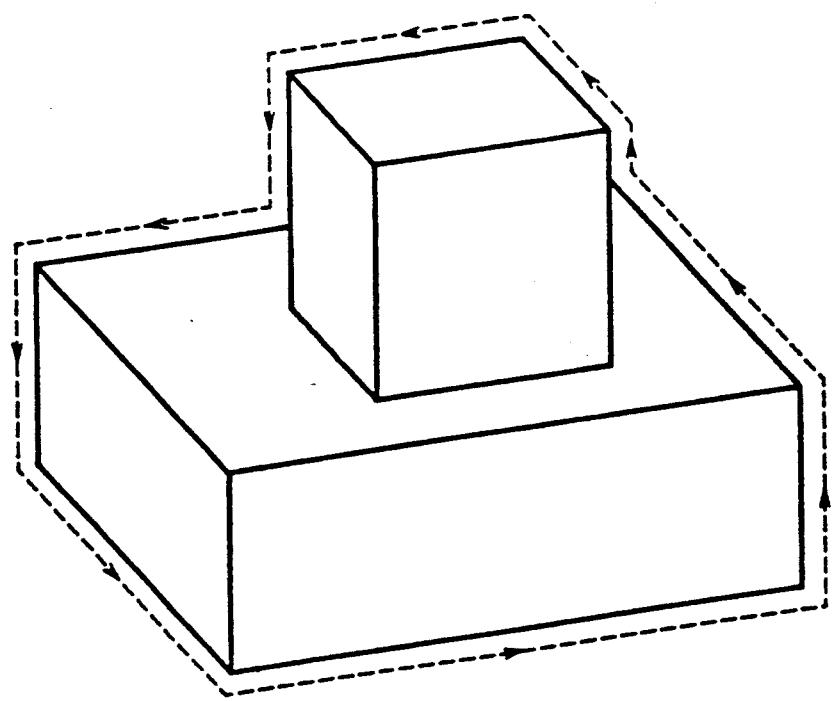
FIG. 11(b) is a schematic diagram of classification of segments where a block floats above a base surface.

On the other hand, where the blocks are floating in the air, then all the segments of the boundary are regarded as the imaginary segments, as shown in FIG. 11(b).

Figure 12:
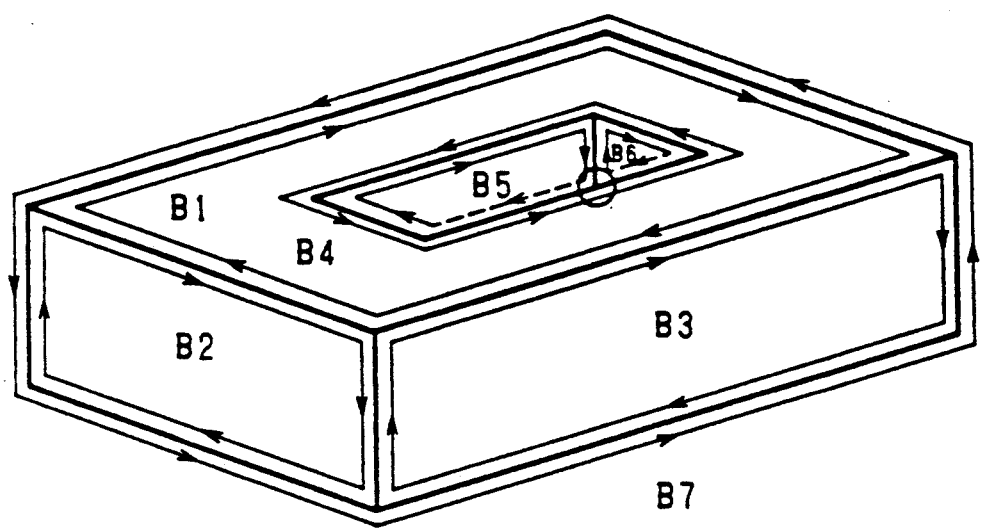
FIG. 12 is a schematic diagram showing a scene of one block with a hole and the associated boundaries.

Next, example is a scene which includes one block having a hole as shown in FIG. 12, In addition, here, consideration is made only on the boundaries which have not appeared in the previous examples.

A counterclockwise boundary B4 including two apparently real segments on it is a hole boundary. In other words, a counterclockwise boundary whereon no apparently real segment on it is not regarded as a hole boundary. When the procedure (1) and the procedure (2) are applying likewise for the segments on the boundary, all the segments on it are determined to be the real segments because they form one planar surface.

Figure 13:
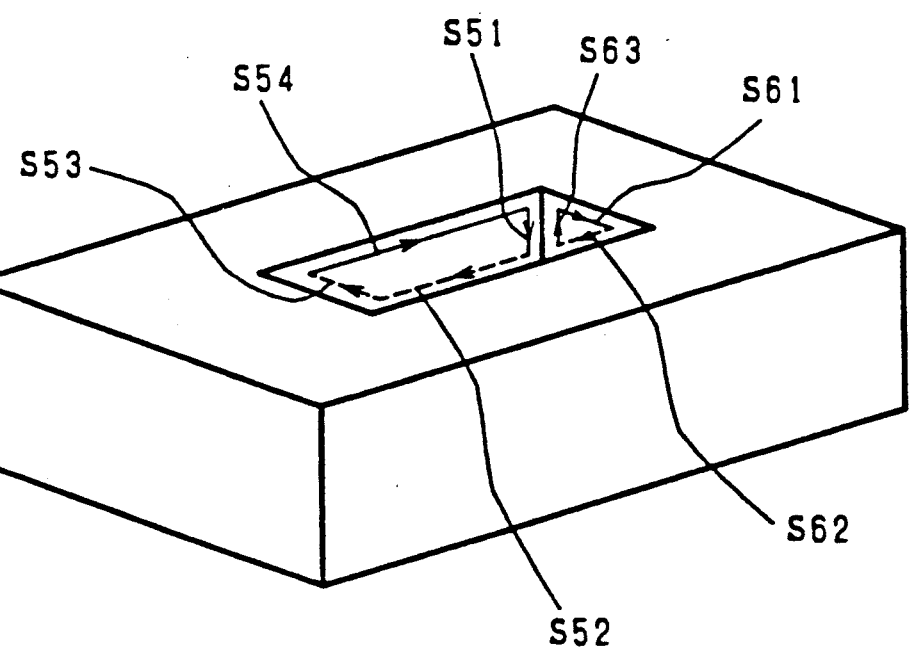
FIG. 13 is a schematic diagram showing a result of classification of segments on clockwise boundaries inside the hole, FIGS. 14(a) and (b) are schematic diagrams showing a result of surface interpolation of the scene of FIG. 6(a)

Consideration is made on the clockwise boundaries B5 and B6 inside of the hole, each of which has one apparently imaginary segments S52 and S62 on it, respectively, as shown in FIG. 13. When the procedure (1) is applied for the boundary B5 with the segments S51, S52, S53 and S54. The segments S53 and S54 can form a planar surface. However, the surface is not regarded as the real segments by the procedure (2) because the segment S52 becomes under the surface.

The segment S53 and the segment S51 can not form a planar surface because they are positioned in a twisted relation.

The last combination of the segments S51 and S54 form a planar surface (the apparently imaginary segment S52 can not be used). In this case, the surface is regarded as the real surface in the procedure (2) because the other segments S52 and S53 are both positioned above the surface. Then, the segments S54 and S51 can be determined to the the real segments and the segments S52 and S53 to be the imaginary segments.

Applying the procedures (1) and (2) to the boundary B6, the segments S61 and S63 can be determined to be the real segments in the same way.

Figure 14A:
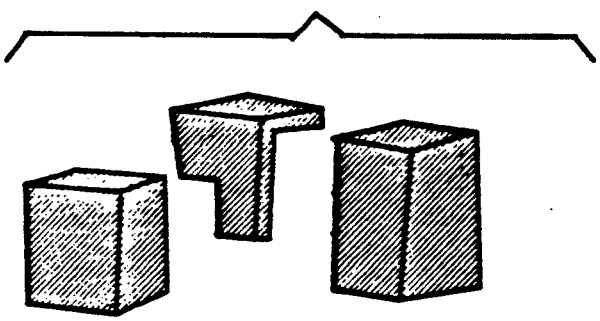
Figure 14B:
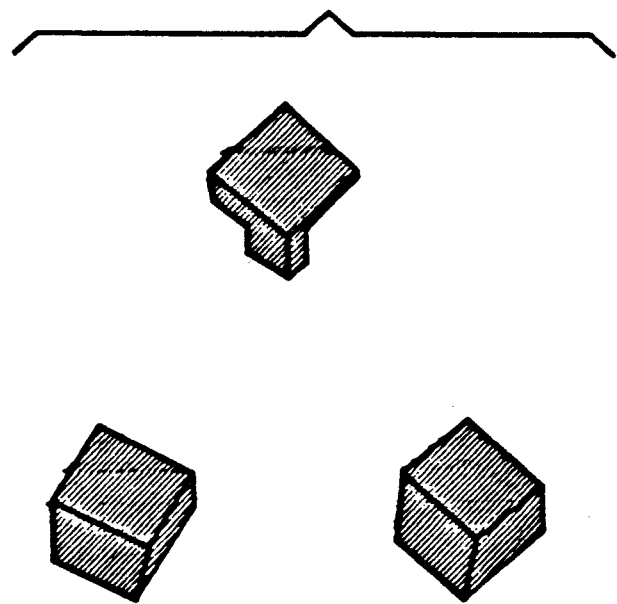
Figure 15A:
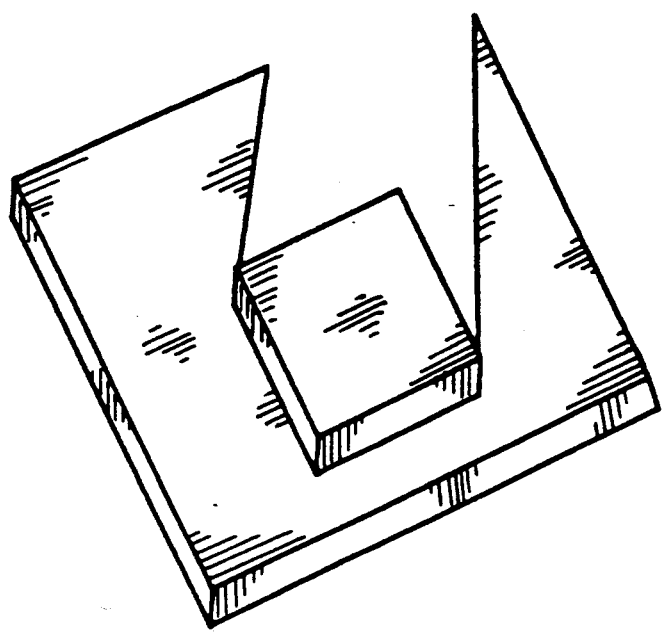
FIG. 15(a) is a schematic diagram showing a result of surface interpolation of a scene where one block exists on the other block.
Figure 15B:
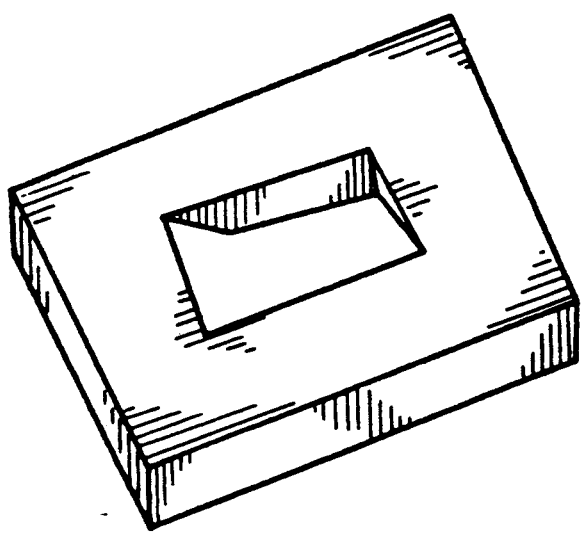
FIG. 15(b) is a schematic diagram showing a result of surface interpolation of a scene where a block with a hole exists.

As result of applying the above-mentioned procedures of the method of the present invention to the images of FIG. 6(a), only the real surface can be generated as shown in FIG. 14(a) and FIG. 14(b). Also, likewise, FIG. 15(a) and FIG. 15(b) show the real surfaces generated from the images of FIG. 9 and FIG. 12.

Subsequently, edges are classified (Step S11).

After interpolating the surface to each region, each segment is classified into the real segment which is just on the surface, the imaginary segment above the surface respectively. After the classification of segments, the ridge edge has two real segments on it and the occluding edge has one real segment and one imaginary segment on it.

Concretely, for example, consideration is made on the three-dimensional block as shown in FIG. 5, which is represented by four boundaries B1 to B4. In the case where this block is floating in the air, the three boundaries B1 to B3 are constituted with only real segments, and the boundary B4 is constituted with only imaginary segments.

On each edge, there are two segments of opposite direction as shown in FIG. 5. For example, the edge wherein the segment S22 of the boundary B2 on it has also the segment S41. Since the segment S41 is the imaginary segment, only the real segment remains on the edge after removing imaginary segments. On the other hand, the edge whereon a segment S21 exists has the segment S31. Since the segments S21 and S31 are both real segments, the both segments on the edge remain even after removing imaginary segments.

Therefore, it is possible to classify edges according to the number of remaining segments after removing imaginary segments. This means that in the case where the edge has two segments on it, the edge is a ridge edge at which two surfaces intersect. In the case where the edge has only one segment on it, the edge is an occluding edge at which the front object occludes the rear objects or background in the image.

Figure 16A:
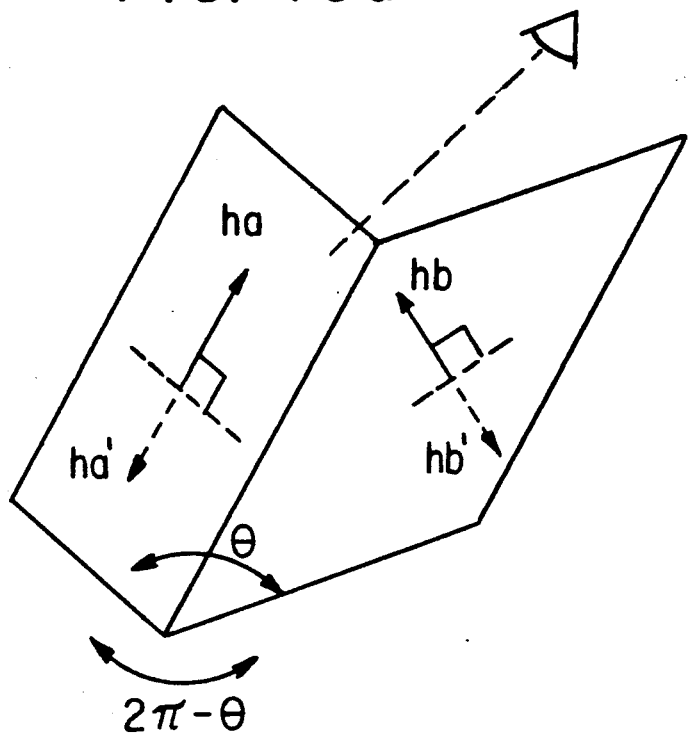
FIGS. 16(a) and 16(b) are a schematic diagram showing a ridge edge and surface normals of both sides of the edge.

Whether the edge is convex, concave or flat is determined by whether this angle is positive, negative or zero. Consider a piece of folded paper like a book in FIG. 16, for example. In case of FIG. 16(a), the angle $\theta$ can be obtained by using the normal vectors ha, hb on the surface which are invisible from the view point. In this case, since $\theta < 2\pi$ (radian), the edge is determined to be concave. On the other hand, "$2\pi - \theta$" can be obtained by using the normal vectors ha', hb' on surfaces which are visible from the view point.

Figure 16B:
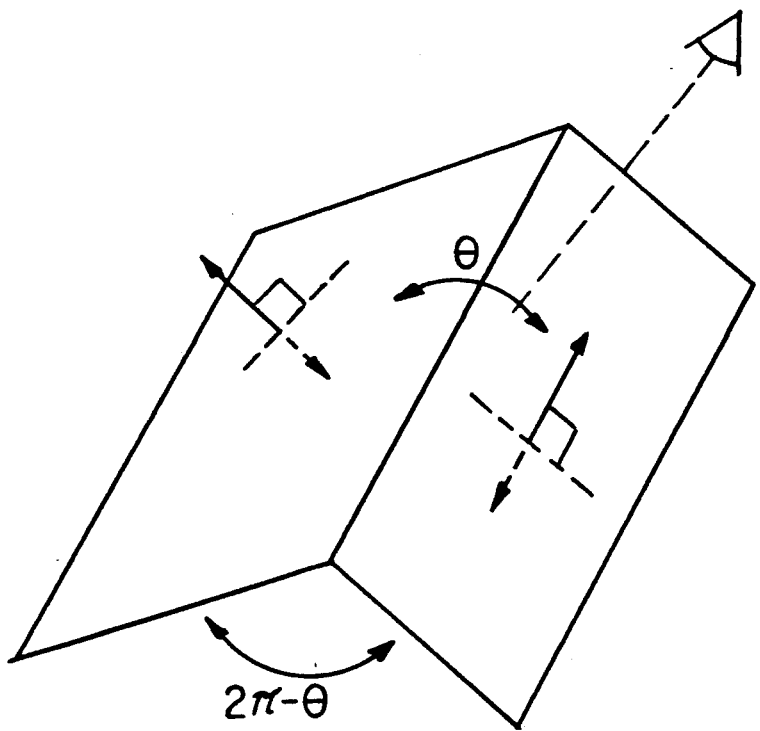

$\theta$ and $2\pi - \theta$ can be classified by whether or not the normal vectors point to the view point side. If the same surfaces are seen from the opposite side, the edge is convex, as shown in FIG. 16(b). In other words, it is important to determine from which side of the surface should be seen. As described above, the edges are classified by using the normal vectors pointing to the view point side.

Figure 17A:
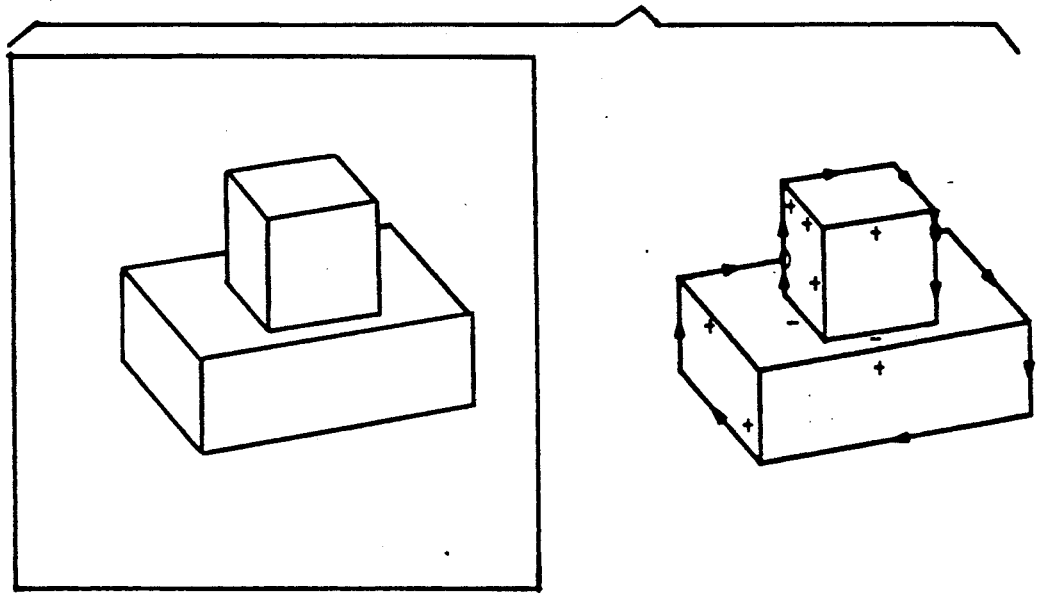
FIG. 17(a) is a schematic diagram showing a result of labeling edges of a scene where one block exists on the other block.
Figure 17B:
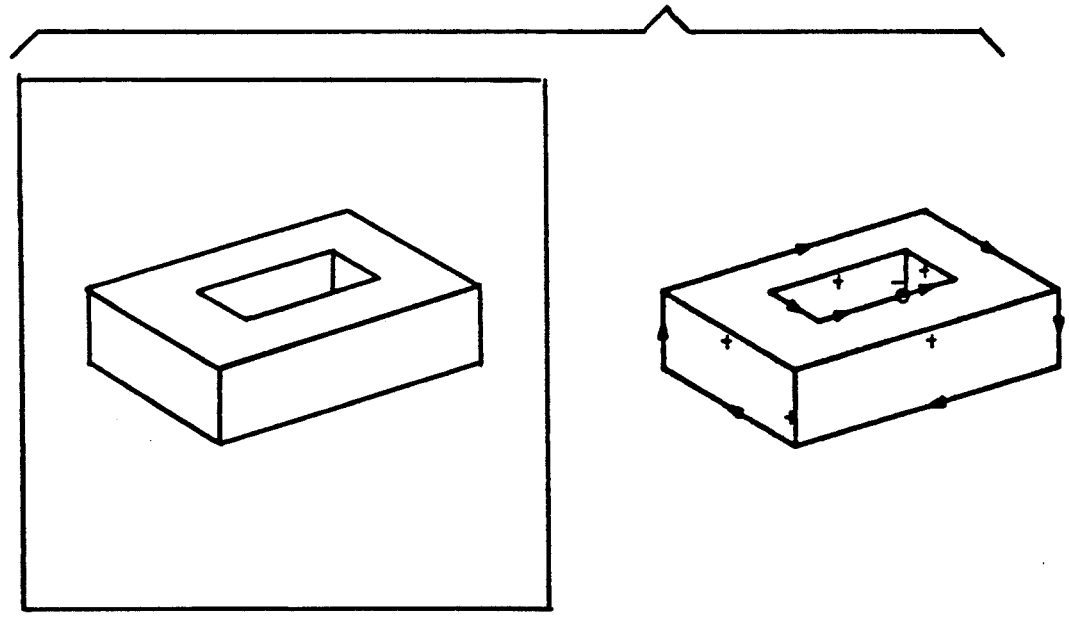
FIG. 17(b) is a schematic diagram showing a result of labeling edges of a scene where a block with a hole exists.

For example, the point of detection of occlusion (shown by ◯) and result of edge classification (the convex ridge edge is shown by "∓", the concave ridge edge is shown by "=", and the occluding edge is shown by "⇐", respectively) are shown for the scene where two blocks are superposed in FIG. 17(a) and for the scene of the block with a hole in FIG. 17(b), respectively.

Figure 18A:
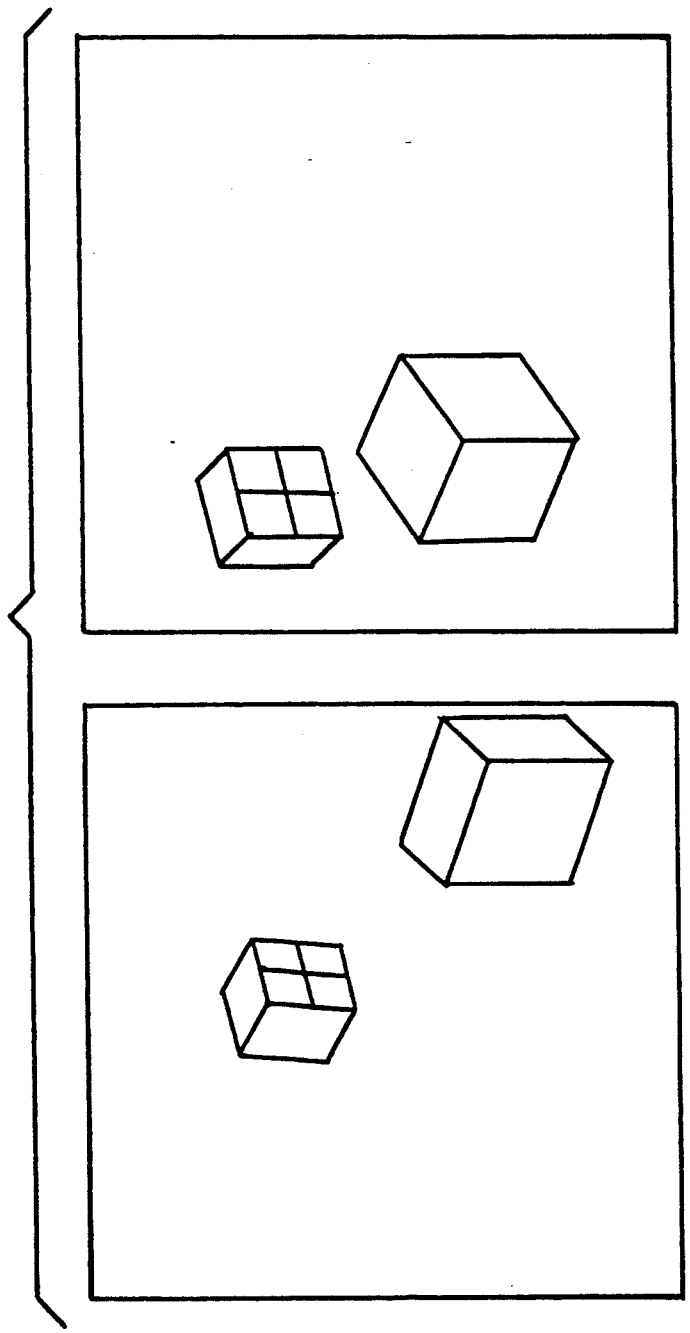
FIG. 18(a) is a schematic diagram showing a pair of stereo images of a scene where a block having a cosmetic pattern on the surface exists.
Figure 18B:
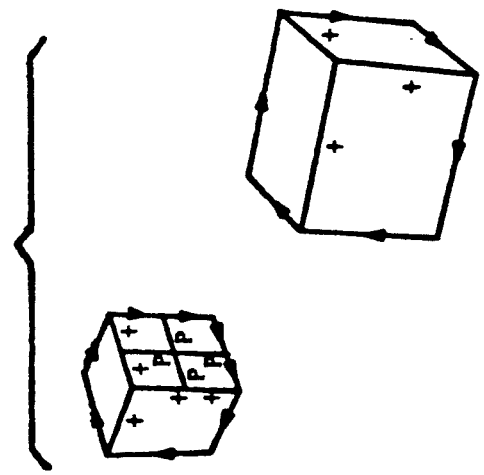
FIG. 18(b) is a schematic diagram showing a result of labeling edges thereof.
Figure 18C:
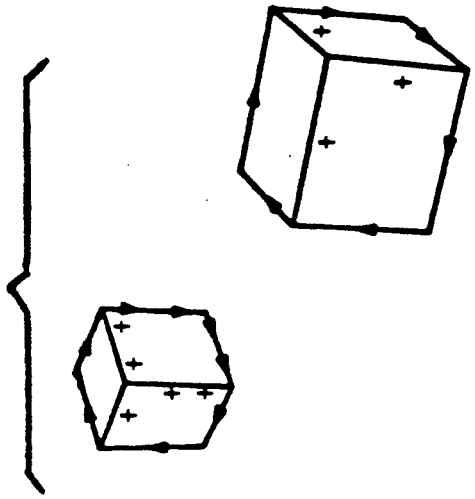
FIG. 18(c) is a schematic diagram showing a result of removing flat ridge edges to obtain the pure solid shape of a block.

Also, where a cosmetic pattern (or shadow) on a surface as shown in FIG. 18(a), the edges caused by the pattern are classified into the flat edges (shown by "p̄") as shown in FIG. 18(b). When the flat edges are removed, a pure shape of the object can be obtained, as shown in FIG. 18(c).

As described above, in accordance with the present invention, it is possible to determine that on which side of the edge the read surface exists from the stereo images and to generate the real surface, though the distance information has been obtained only on the edges, it becomes possible to obtain the distance information at any point on the real surface. Also, it is possible to classify edges into occluding or ridge edges according to the number of segments on the edge after removing imaginary segments, and to further classify ridge edges into convex, concave and flat edges according to the angle between the surface normals on both sides of the ridge edges.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such the meets and bounds thereof are therefore intended to be embraced by the claims.

What is claimed is:

1. Am image processing method for matching edges described in images of the same objects present in a three-dimensional scene which are viewed simultaneously by two or more image pick-up devices located at different positions, and real planar surfaces of said objects surrounded by closed boundaries are estimated, comprising:

setting two boundary segments with opposition directions on each edge of an object, classifying each segment on the boundary using positions of points of occlusion into apparently real segments on the surface which occlude an object or a background to the rear, apparently imaginary segments which are on the opposite side of the apparently real segments, or undefined segments which are not defined to be the apparently real segments or the apparently imaginary segments, and for each boundary
(a) finding a planar surface which has all apparently real segments and no apparently imaginary segment on it;
(b) in the case where there is only one surface which has no segment under it, determining said one surface to be an actually existing surface to be referred to as the real surface, and
(c) classifying the undefined segments into real segments which exist on the real surface or imaginary segments which exist above the real surface.

2. An image processing method for matching edges detected in images of the same objects present in a three-dimensional scene which are viewed simultaneously by two or more image pick-up devices located at different positions, and real planar surfaces of said objects surrounded by closed boundaries are estimated, comprising:

setting two boundary segments with opposite directions on each edge of an object, classifying each segment on the boundary using positions of points of occlusion into apparently real segments on the surface which occludes an object or a background to the rear, apparently imaginary segments which are on the opposite side of the apparently real segments, or undefined segments which are not defined to be the apparently real segments or the apparently imaginary segments, and for each boundary
(a) finding a planar surface which has all apparently real segments and no apparently imaginary segment on it,
(b) in the case where there is only one surface which has no segment under it, determining said one surface to be an actually existing surface to be referred to as the real surface, and
(c) classifying the undefined segments to real segments which exit on the real surface or imaginary segments which exist above the real surface, and for each edge
(a) in the case where both segments on the edge are the real segments, classifying said edge to be a ridge edge at which two surfaces intersect, and in the case where only one segment on the edge is the real segment, classifying said edge to be the occluding edge at which the front object occludes a rear object or the background, and
(b) further classifying each ridge edge into a convex edge, a concave edge, or a flat edge according to the angle between normals of the surface on both sides of the edge.

* * * * *